Nov. 13, 1962 R. M. DOWNING ET AL 3,064,073
INSULATED ELECTRICAL CONDUCTOR
Filed July 27, 1960
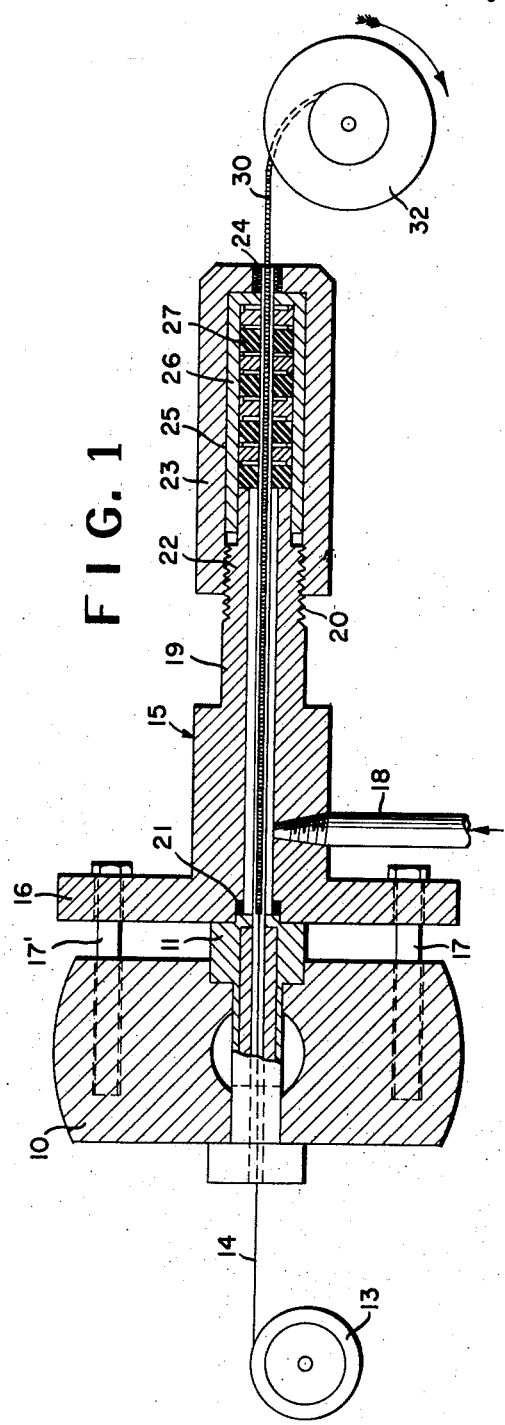
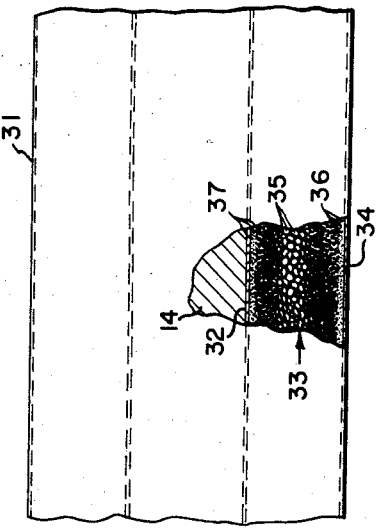
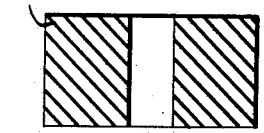
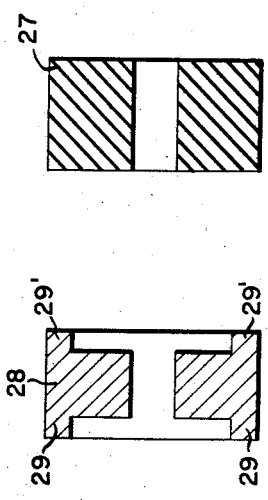
INVENTORS
RICHARD M. DOWNING
MACK F. FULLER
OSBORN H. PADDISON
LOUIS T. STAATS, JR.
NATHANIEL C. WYETH
BY
*Jules H. Steinberg* ATTORNEY ary of the United States Patent Office
3,064,073
Patented Nov. 13, 1962

3,064,073
INSULATED ELECTRICAL CONDUCTOR
Richard M. Downing, Woodstown, and Mack F. Fuller, Woodbury, N.J., and Osborne H. Paddison, Swarthmore, Louis T. Staats, Jr., Lewisville, and Nathaniel C. Wyeth, Rosedale, Pa., assignors to E. I. du Pont de Nemours and Company, Wilmington, Del., a corporation of Delaware
Filed July 27, 1960, Ser. No. 45,586
4 Claims. (Cl. 174—110)

The present invention relates to novel insulated electrical conductors. More particularly the present invention pertains to metal wire having a coating of insulation which consists primarily, but not completely, of an expanded cellular thermoplastic composition, especially expanded cellular polyvinylchloride (PVC).

This application is a continuation-in-part of our prior co-pending application Serial No. 568,591 filed February 29, 1956, now abandoned.

In the field of insulated electrical wire, the prior art discloses numerous compositions which have been used for insulation purposes. These include a wide variety of inorganic and organic substances. Organic elastomers and resins have proven to be particularly suitable and convenient in many respects. The utility of the elastomers and resins in this connection would be materially enhanced if it were possible to significantly lower the cost of such insulation per unit of insulated wire.

It is an object of the present invention to provide a wire conductor with a coating of thermoplastic insulation which is cheap, easily applied continuously at high speeds, and which has suitable and advantageous dielectric and mechanical properties. It is a further object of the present invention to provide such a coating of insulation, particularly of polyvinylchloride, in such a form that its advantageous insulating properties are retained utilizing a minimum of the plastic material. These and other objects will become apparent from a consideration of the following specification and claims.

The invention resides in a novel insulated metal wire in which the jacket of insulation comprises a continuous sheath of a closed-cell expanded cellular thermoplastic resin sandwiched between thin inner and outer skins of solid unexpanded resin. The distribution of cells within the sheath is such that the largest cells are located in the central region of the sheath and the smallest cells are in the outer region adjacent the outer skin of unexpanded plastic. The precise nature of this insulated wire and a suitable method for producing it will be more readily understood by consideration of the following detailed description thereof and the accompanying drawing in which FIGURE 1 represents a cross-sectional view of a typical embodiment of an apparatus for carrying out the process of the present invention.

FIGURES 2 and 3 represent enlarged cross-sectional views of certain components of a seal utilized in the apparatus of FIGURE 1; and FIGURE 4 represents a view partly in cross-section of the novel coated wire product of the present invention.

Cellular plastic materials have been used for years in a wide variety of products for home and industry. Cellular plastics, for example, cellular PVC, are prepared by foaming a mixture consisting primarily of the resin and a suitable plasticizer therefor. The PVC mixture may contain in addition any of a variety of optional additives such as anti-oxidants, stabilizers, fillers, lubricants, pigments, or the like, all with a view to providing the cellular product with specific physical properties. The foaming may be accomplished mechanically by the use of gas under pressure, or it may be accomplished chemically by the use of a chemical blowing agent which decomposes upon heating to release a gas. A typical technique for expanding polyvinylchloride and similar thermoplastic resins by the use of chemical blowing agents is disclosed in U.S. Patent No. 2,491,709 issued December 20, 1949, to Briggs et al.

There are a wide variety of chemical blowing agents disclosed in the prior art which have been successfully used for expanding PVC and other thermoplastic resins. These include dinitrosopentamethylene, tetramine, diazoamino benzene, phenylhydrazines, azo dinitriles, carbonates, aryl azo sulfones, urea, biuret, di-N-nitroso piperazine, and many others. The gaseous decomposition products of these various blowing agents vary with the chemical structure of the agent. We have found that blowing agents which evolve nitrogen upon thermal decomposition are especially suitable in the preparation of expanded cellular material to be used as electrical insulation. Of the nitrogen evolving blowing agents, N,N'-dimethyl N,N'-dinitroso terephthalamide has proved to be particularly effective. A suitable method of preparing this compound is disclosed in U.S. Patent No. 2,754,326 issued July 10, 1956 to Bradley and Fuller.

FIGURE 1 illustrates an apparatus with which the novel insulated wire of the present invention has been successfully manufactured. In this figure, 10 designates the discharge head of a suitable extruder mechanism. The details of the extruder form no part of the present invention and the extruder may be of any conventional or suitable type which is commonly used for the extrusion of thermoplastic materials. Such a device characteristically includes a steam or electrically heated rotary auger of varying diameter with respect to its casing. The auger usually has a section at the intake end of constant diameter followed by a section of increasing diameter which is known as the compression section. This is characteristically followed, in turn, by a metering section which is again of constant diameter but larger than the diameter at the intake. Following the metering section there is frequently located a torpedo head whose outside diameter is almost as large as the inner diameter of the jacket thus forcing the molten, thermoplastic material through a very confined area. A die having a bore of suitable configuration is located after the torpedo head through which the thermoplastic material is extruded in the desired shape.

In FIGURE 1, 12 represents the die depicted as having a tapered bore and being mounted in a suitable die holder 11. A pressure chamber 15 is mounted in direct contact with die holder 11 and is secured rigidly in position by bolts 17 and 17' which pass through flange 16 of the pressure chamber and are anchored in head 10 of the extruder. Materials emerging from the die are extruded directly into the pressure chamber 15 which has a water inlet 18 at one end near the die holder 11 and an extension 19 of reduced cross-sectional area at the remote end. Extension 19 is provided with screw threads 20 for at least a portion of its extent. An O-ring 21 resting in a suitable recess on the end of the pressure chamber in contact with the die holder 11 provides a water-proof seal at that connection.

The extension 19 of the pressure chamber has a short narrow neck 22 which is still further reduced in cross-sectional area from that of the extension. An open-ended jacket 26 slidingly telescopes the neck 22 and contains a series of alternate rubber washers 27 and metal washers 28. The metal washers, one of which is shown in cross-section in FIGURE 2, are provided with outwardly directed opposing flanges 29 and 29'; each flange being in direct contact with an adjacent rubber washer 27, shown in FIGURE 3. The inner end of neck 22 is in abutting relation with the bank of washers 27, 28.

Washers 27 and 28 and jacket 26 in the aggregate form a labyrinth seal, designated generally at 25, the operation of which will be more particularly hereinafter described. An outer encasement 23 with internal threads at one end is moveably mounted on the threaded extension 19.

The operation of the device is as follows: The extruder is charged with a solid mixture consisting primarily of polyvinylchloride, or other thermoplastic resin, and a suitable plasticizer, and containing a blowing agent, and other additives which may be desired. While this mixture, commonly called a plastisol, is travelling through the extruder which is heated, the blowing agent undergoes thermal decomposition and evolves a gas that foams the plastisol. The resultant foam is delivered to the extruder head 10 under pressure. A bare electrical conductor or wire 14 from a suitably positioned drum 13 enters the extruder head in a position generally normal to the longitudinal axis of the extruder mechanism. The wire 14 is so positioned that it passes through the tapered bore of the die 12 at the center thereof. When the extruder is operating, the plastic foam is extruded through the die 12 and the wire 14 thus emerges from the die into the pressure chamber 15 with a coating of expanded cellular plastic material completely encircling it. The cellular plastic coating is characterized by thin inner and outer skins of unexpanded plastic, as will be more particularly hereinafter described. Water or other suitable fluid medium is pumped into the interior of the pressure chamber under pressure via inlet 18. The water pressure in the chamber prevents the gaseous components of the cellular plastic coating from escaping and rupturing the outer skin before the plastic has had an opportunity to gel or set. The coated wire passes through the pressure chamber 15 and into the labyrinth seal 25 from which it emerges via the orifice 24 in the encasement 23. Upon emergence from the cell, the coated wire may be passed through a cooling trough of water (not shown) and wound upon a suitably positioned drum 32 for storage.

The diameters of the central perforations in rubber washers 27 may be adjusted such that the rubber washers actually touch the coated wire as it passes through the seal or are spaced a short distance therefrom. This adjustment is accomplished by rotating the outer encasement 23 on screw threads 20. As viewed in FIGURE 1, lateral movement of encasement 23 to the left will press the washers 27 and 28 into tighter contact due to the abutment of the end of the neck 22 with the inner washer. Since contact of the rubber washers with the metal washers 28 takes place first through flanges 29 and 29' near the outer periphery of the rubber washers, compression of all washers tends to deflect the rubber washers inwardly by reducing the diameters of their central perforations. In actual practice, it may be desirable to so position the encasement 23 laterally on the extension 19 that the internal perforations of rubber washers 27 are actually spaced a short distance from the surface of the coated wire. This permits passage of the coated wire through the seal 25 without deformation or damage to the coating of insulation 31. When the encasement 23 and the washers 27 are adjusted in this manner, the labyrinth seal will not operate to prevent escape of at least some of the water through orifice 24. However, by its very nature the seal will not permit large quantities of water to pass through it in short periods, and suitable adjustment of the water pressure at inlet 18 will easily maintain sufficient pressure within chamber 15 to prevent the expanded cellular plastic from collapsing before it has had an opportunity to set.

While we have described a suitable apparatus for preparing the novel coated wire product in detail, the apparatus forms no part of the present invention which is confined to the product itself.

The following table illustrates sample formulations which have been successfully used in the practice of the present invention for the preparation of our novel insulated wire. The formulations, which are intended as exemplary only, were fed to the extruder in each instance and were foamed in the extruder by thermal decomposition of the blowing agent before entering the extruder head 10.

| | Formulation | | | | | | |
|---|---|---|---|---|---|---|---|
| | 1, parts | 2, parts | 3, parts | 4, parts | 5, parts | 6, parts | 7, parts |
| Polyvinylchloride | 100 | 100 | 100 | 100 | 100 | 100 | 100 |
| N,N'-dimethyl N,N'-dinitroso terephthalamide in paraffinic hydrocarbon oil (70/30) | 15 | 15 | 15 | 15 | 15 | 15 | 15 |
| Dioctyl Phthalate | 30 | 30 | 30 | 20 | 30 | | 30 |
| Tricresyl Phosphate | | | | | | 30 | |
| "Aroclor" 1268 [1] | 30 | 25 | 20 | 20 | | 30 | 30 |
| Toluene | | | | | 30 | | |
| Tribasic Lead Sulfate | 10 | 10 | 10 | 10 | 10 | 10 | 10 |
| Kenflex A [2] | | 5 | | | | | |
| Powdered Calcium Carbonate | | | 10 | | | | |
| Pigments | | | | | | | 2 |

[1] A highly chlorinated polyphenyl, manufactured by Monsanto Chemical Company.
[2] A polymeric aromatic hydrocarbon, manufactured by Kenrich Corporation.

Satisfactory products have been obtained with formulation 1 in the above table when other blowing agents were substituted for the 15 parts of the 70/30 mixture of N,N'-dimethyl N,N'-dinitroso terephthalamide in paraffinic hydrocarbon oil, 10 parts of diphenyl ether 4,4'-disulfonhydrazide, 10 parts of azodicarbonamide, 15 parts of a 40/60 mixture of dinitrosopentamethylenetetramine and inert silica plus 5 parts of urea.

The precise nature of the novel insulated wire of the present invention is illustrated in detail in FIGURE 4. In this figure, 14 designates the filamentary metallic core, i.e. the metal wire, and 31 the jacket of insulation. The latter has three distinct components which are all integral: (1) a thin inner skin 32 of solid unexpanded PVC surrounding the wire 14, (2) a continuous sheath 33 of expanded cellular polyvinyl chloride which is concentric and integral with the inner skin 32, and (3) a thin, smooth, tough, uniform, continuous outer skin 34 of solid unexpanded PVC integral with and encasing the sheath 33.

The cell structure of the sheath 33 of expanded cellular PVC is predominantly closed-cell and this represents a vital and critical feature of the novel product of the present invention. By "predominantly closed-cell" is meant 80% or more of the cells present are closed cells. As is well known in the art, closed-cell expanded cellular material is characterized by a multiplicity of individual, discreet gaseous cells which are not interconnected. Material of this type is frequently referred to in the art as "unicellular." A principal and characterizing property of a closed-cell expanded cellular plastic is its imperviousness to water even when submerged under water for extended periods. Since the gaseous cells are individual and unconnected, there is no path provided in sheath 33 by which water can travel through the cellular plastic down toward the metallic core. That is to say, should the outer skin 34 rupture for any reason, for example, due to sustained abrasion, the sheath 33 of unicellular plastic will not permit ingress of moisture into or through the insulated jacket 31.

A further important feature of the novel insulated wire of the present invention relates to the relative size and distribution of the gaseous cells within sheath 33. A very significant property of a jacket of insulation on a metallic wire is its resistance to abrasion. In the case of expanded cellular plastics, this is a special problem inasmuch as the jacket of insulation per unit of thickness contains substantially less solid material than in the case of a solid unexpanded plastic coating. The novel product of the present invention is characterized by a sheath 33 of expanded cellular plastic having its largest cells 35 at the central region of the sheath midway between the skins 32 and 34, the cells diminishing in size as they approach the outer skin 34 such that the cells 36 in the vicinity of outer skin 34 are the smallest. With such a cell structure, the sheath 33 of expanded cellular PVC is considerably denser in its outer regions than it is at its core, i.e. the outer regions of the sheath 33 contain substantially more solid material per unit volume than its central regions and thus are much better able to withstand deformation due to abrasion than a sheath of expanded cellular plastic containing the same percentage of gas by volume but having a substantially uniform cell structure throughout. Generally speaking, the cells 36 in the outer regions of sheath 33 will preferably be at least as small as ¼ to ⅒ the size of the cells 35 in maximum cross-sectional dimension. The cells 37 in sheath 33 adjacent the inner skin 32 may be comparable in size to the cells 36, as illustrated in FIGURE 4, or they may be larger and more comparable in size to the center cells 35. In the apparatus depicted in FIGURE 1, this would generally be a function of the temperature of wire 14 as it passes through the extruder mechanism. If the wire 14 is cold, i.e. at room temperature when it enters the extruder, the cells 37 will tend to be small, along the order of cells 36, as illustrated in FIGURE 4, whereas if wire 14 is heated prior to its passage through the extruder mechanism, the cells 37 will normally be larger in size, along the order of cells 35. The precise size of the inner cells 37 as compared with the central cells 35 is not critical in the sense that the size of cells 36 is since cells 37 are not so significant with respect to the abrasion resistance of the insulated conductor.

The novel product of the present invention is prepared in continuous, extended lengths, i.e. hundreds or thousands of uninterrupted yards long, and this is easily achieved, for example, by means of the apparatus depicted in FIGURE 1. This apparatus may be run continuously for long periods to prepare at high speeds continuous extended lengths of coated wire of the type illustrated in FIGURE 4. Closed-cell PVC and its utility as electrical insulation has been known for some time, but prior to the present invention, insulated wire products in which the insulation consisted of predominantly closed-cell expanded cellular PVC in very long uninterrupted lengths has not been known. The development of such a product has been seriously hampered by the unavailability of facilities for continuously applying such a jacket of insulation, for example, by a continuous high speed extruder. The problem with such equipment is how to keep the cells closed. The apparatus of FIGURE 1 has overcome this problem and makes possible for the first time a product of this type in long continous uninterrupted lengths. In fact there is really no upper limit to the uninterrupted length in which the product of the present invention may be prepared. The apparatus depicted in FIGURE 1 may be operated continuously without interruption around the clock for very long periods, i.e. weeks or even months.

The several components 32, 33, 34 of the insulation jacket 31 are unitary, i.e. are all integral. As the product 30 emerges from the labyrinth seal 25, the wire 14 is provided with the jacket 31 characterized by these three components. The inner skin 32 provides an inner base for the jacket followed by the sheath 33 of expanded cellular material which is, in turn, encased by the outer skin 34. The latter is a thin but tough skin that is smooth surfaced, which is important if the product is to be useful for most industrial applications.

The advantageous and desirable characteristics of the novel insulated wire product of the present invention are attributable to the fact that the product is prepared on continuous high speed extrusion equipment. Though the novel product may be attainable with apparatus other than the specific mechanism depicted in FIGURE 1, the use of extrusion equipment is believed critical to the formation of an insulated wire product having the features and properties described herein. It is believed that no method of preparation other than high speed extrusion will yield such a product.

The thickness of the skins 32 and 34 is quite small compared to the thickness of sheath 33. A typical product of the present invention will have skins 32 and 34 along the order of 1 to 2 mils in thickness with a sheath 33 which is 30 mils thick on a No. 14 A.W.G. (0.0641" diam.) wire. On a volume basis, therefore, by far the greatest percentage of the insulating jacket 31 consists of expanded cellular plastic with all the consequent economic advantages which this entails.

For industrial consumption, it is important that the wire 14 be substantially centered within the jacket 31. A wire which is off-center with respect to the insulation would have little industrial utility. With apparatus of the type illustrated in FIGURE 1, centering is easily achieved.

While the novel product of the present invention has been described largely in terms of wire coated with closed-cell polyvinylchloride, the invention is not limited to that one resin. The novel product may be prepared with any thermoplastic polymer which is susceptible of expansion into cellular form, such as polyethylene, polypropylene, polyvinyldichloride, and other thermoplastics and elastomers. Coated wire products having a closed-cell PVC insulation as described herein represent a preferred embodiment of the invention inasmuch as this resin is economical, convenient to work, and results in a fine uniform product having excellent electrical and mechanical properties.

Incorporation in the PVC plastisol of suitable pigments, antioxidants, and the like to provide the insulation with specific properties is within the scope of the invention. The insulating properties of the coating of the present invention compare very favorably with those of other insulation materials described in the prior art. It will, however, be much cheaper than most of the prior art materials inasmuch as the resin is greatly extended by a substantial percentage of gas cells. By means of the present invention it is possible to provide a coating of insulating material which contains as little as 25 percent by volume of the solid polyvinylchloride or other resin. Inasmuch as the gaseous components of the coating, for example nitrogen, will themselves have excellent insulation properties, the coating will not only be extremely favorable from an economic standpoint but will also have excellent dielectric properties.

Any suitable plasticizer may be used for formation of the plastisol. If the resin is polyvinylchloride, such plasticizers as tricresyl phosphate, dioctyl phthalate, dioctyl sebacate, dioctyl adipate, polypropylene glycol esters, chlorinated paraffins, chlorinated aromatics, e.g., chlorinated polyphenyls, and the like may be used.

Suitable stabilizers for polyvinylchloride may also be used to enhance the polymer's stability to light and heat. Organic and inorganic lead salts, e.g., dibasic lead phthalate and tribasic lead sulfate, metallic soaps, e.g., barium calcium laurate, epoxy compounds, e.g., diglycidyl ether or butyl epoxy stearate, and organometallic complexes are exemplary of such stabilizers.

Having thus decribed a typical embodiment of our invention it will be readily apparent that the underlying principles herein disclosed may be embodied in any other organization or arrangement differing widely from those illustrated without departing from the spirit of the invention. We, therefore, intend to be limited only by the following claims.

We claim:

1. As a new product, an improved insulated electrical conductor consisting essentially of an uninterrupted extended length of a filamentary metallic core surrounded by a continuous jacket of insulation comprising a thin continuous inner skin of a thermoplastic resin covering said metallic core, a continuous sheath of expanded cellular thermoplastic resin surrounding said skin and integral therewith, the predominant portion of cells in said expanded cellular resin being individual, discreet, non-interconnected closed cells, and a thin, smooth, tough, uniform, continuous outer skin of unexpanded thermoplastic resin encasing said expanded cellular resin sheath throughout its length, the cells in the central portion of the expanded cellular resin sheath being considerably larger in size than the cells in the vicinity of the said outer skin, said insulated electrical conductor being substantially impervious to and substantially unaffected by moisture.

2. A new product as in claim 1 wherein the extended metallic core is centered within said continuous jacket of insulation.

3. A new product as in claim 2 wherein the size of the cells in the central region of the sheath are on the average at least about 4-10 times as large as the cells in the sheath adjacent the outer skin.

4. An improved insulated electrical conductor consisting essentially of an uninterrupted extended length of a filamentary metallic core centered in and surrounded by a continuous jacket of insulation comprising a thin continuous inner skin of a polyvinylchloride resin covering said metallic core, a continuous sheath of expanded cellular polyvinylchloride surrounding said skin and integral therewith, the predominant portion of cells in said expanded cellular polyvinylchloride being individual, discreet, non-interconnected closed cells, and a thin, smooth, tough, uniform, continuous outer skin of unexpanded polyvinylchloride encasing said expanded cellular polyvinylchloride sheath throughout its length, the cells in the central portion of the expanded cellular polyvinylchloride sheath being at least about 4-10 times as large as the cells in the vincinity of the said outer skin, said insulated electrical conductor being substantially impervious to and unaffected by moisture.

References Cited in the file of this patent

UNITED STATES PATENTS

| | | |
|---|---|---|
| 2,256,483 | Johnston | Sept. 23, 1941 |
| 2,737,503 | Sprague et. al | Mar. 6, 1956 |
| 2,782,251 | Ebel et al. | Feb. 19, 1957 |
| 2,805,276 | Weitzel | Sept. 3, 1957 |
| 2,973,552 | Downing el al. | Mar. 7, 1961 |

FOREIGN PATENTS

| | | |
|---|---|---|
| 742,760 | Great Britain | Jan. 4, 1956 |
| 839,841 | Great Britain | June 29, 1960 |